United States Patent [19]
Bayley et al.

[11] Patent Number: 5,487,175
[45] Date of Patent: Jan. 23, 1996

[54] METHOD OF INVOKING AND CANCELING VOICE OR DATA SERVICE FROM A MOBILE UNIT

[75] Inventors: Gwain Bayley; Matthew S. Grob, both of San Diego; Gadi Karmi, Del Mar; Robert H. Kimball; David S. Propach, both of San Diego, all of Calif.

[73] Assignee: Qualcomm Incorporated, San Diego, Calif.

[21] Appl. No.: 152,162

[22] Filed: Nov. 15, 1993

[51] Int. Cl.⁶ ........................................ H04B 1/00
[52] U.S. Cl. ..................... 455/54.2; 455/33.1; 379/59; 379/93; 379/100
[58] Field of Search .................. 455/33.1, 54.1, 455/54.2, 56.1, 68, 88; 379/63, 58, 59, 100, 94, 93; 370/110.4, 111, 118

[56] References Cited

U.S. PATENT DOCUMENTS

| | | | |
|---|---|---|---|
| 4,675,863 | 6/1987 | Paneth et al. | 370/50 |
| 4,811,420 | 3/1989 | Avis et al. | 379/63 |
| 4,817,089 | 3/1989 | Paneth et al. | 370/95 |
| 4,912,705 | 3/1990 | Paneth et al. | 370/95.1 |
| 5,121,391 | 6/1992 | Paneth et al. | 370/95.1 |

Primary Examiner—Edward F. Urban
Assistant Examiner—Mary M. Lin
Attorney, Agent, or Firm—Russell B. Miller; Katherine W. White

[57] ABSTRACT

A method of invoking and canceling voice and data service between a mobile unit and a base station. Using a standard telephone system, the connection for a voice service and a data service is the same. With the introduction of the digital wireless link, the voice connection and the data connection are different. Therefore new dialing commands which indicate the intent of the connection are created. These commands can also be used to designate the intent of the call from a mobile unit capable of data and voice service but not capable of simultaneous voice and data service. They can also be used to invoke simultaneous voice and data services.

6 Claims, 3 Drawing Sheets

METHOD OF INVOKING AND CANCELING VOICE OR DATA SERVICE FROM A MOBILE UNIT

BACKGROUND OF THE INVENTION

I. Field of the Invention

The present invention relates to communication. More particularly, the present invention relates to a novel and improved method of invoking and canceling a voice or a data connection.

II. Description of the Related Art

A variety of apparatus exists today that use standard telephone networks to convey data from one terminal to another. One of the most common terminals which uses a standard telephone network to convey data is the facsimile (FAX) machine. Like other terminal equipment that uses standard telephone networks, a FAX machine uses a modem to translate digital information to audible analog tones for transmission over the telephone network. At the receiving FAX machine, a modem is used to convert the tones back into an estimate of the original digital information sent by the transmitting FAX machine.

With the deployment of cellular and personal communications wireless systems, the end user may wish to connect his terminal equipment to a mobile communication device instead of directly to a land telephone network. Digital wireless communication equipment typically uses vocoders to convert incoming voice signals into digital bits for transmission over the channel and to perform the reverse function. Vocoders are tailored to sample and compress human voice. Because modem tones differ significantly from human voice, the vocoder can degrade the modem tones. Also maximizing the capacity of a wireless system in terms of the number of simultaneous users that can be handled is extremely important. Digitizing modem tones with a vocoder and sending them over the digital wireless link is an inefficient use of the radio channel.

A more efficient, flexible, and reliable transmission means is to provide a mechanism to transmit the digital data over the digital wireless link directly, thus providing a mobile unit that has the capability to receive and produce both audible voice and digital data. This configuration presents some unique opportunities to take advantage of the digital link to provide high quality service. One principal advantage is that a mobile unit capable of both data and voice services may be used simultaneously to provide both services.

It is therefore the object of the present invention to provide a method and apparatus of invoking simultaneous voice and data service with a single mobile unit.

SUMMARY OF THE INVENTION

The present invention is a novel method of invoking and canceling voice and data service between a mobile unit and a base station. A mobile unit capable of simultaneous voice and data service must be able to transition between several states. Voice communication has two different states: active and idle. Data communication is made up of two links having three possible states: command mode and data idle, command mode and data active, data mode and data active. The command mode and data mode refer to the status of communication between the modem and the terminal unit. Command mode indicates that the modem itself is receiving commands from the terminal unit. Data mode indicates that the modem is transparently passing data to and from the terminal unit.

Together the two voice states and the three data states combine to create six different states in which a dual capability mobile unit may operate. The key to operation within the dual capability mobile unit is the ability to transition between the six states. Standard modem commands may be incorporated into the present invention. However a set of new commands is necessary for complete functionality.

Using a standard telephone system, the connection for a voice service and a data service is the same. With the introduction of the digital wireless link, the voice connection and the data connection are different. For example, the base station must know whether to route an incoming call to a DSP and modem combination or to a vocoder. Therefore new dialing commands which indicate the intent of the connection are created. These commands can also be used to designate the intent of the call from a mobile unit capable of data and voice service but not capable of simultaneous voice and data service.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
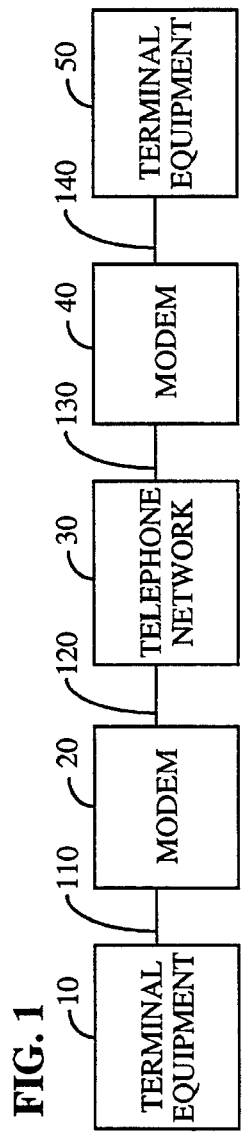
FIG. 1 is an apparatus that uses standard telephone networks to convey data from one terminal to another.

Several methods exist today that use standard telephone networks to convey data from one terminal to another. Terminals that connect by telephone networks can be FAX machines, personal computers, credit card verification machines, and telemetry devices. The standard connection of these types of devices is shown in FIG. 1. For example assume terminal equipment 10 is transmitting information to terminal equipment 50. Terminal equipment 10 produces digital data 110 representative of the information. Modem 20 converts digital data 110 to analog signal 120. Analog signal 120 is of a proper bandwidth and power level to be transferable over standard telephone network 30. Telephone network 30 conveys analog signal 120 to its destination. The telephone network may introduce noise such that output audible signal 130 is an estimate of analog signal 120. Modem 40 converts audible signal 130 to digital data 140 which is an estimate of digital data 110. Terminal equipment 50 receives digital data 140 and can act on the estimate of the information sent by terminal equipment 10. Most such links are bi-directional with the reverse functions working in the same manner as the forward.

FIG. 1 is a highly simplified diagram. Actual implementations of these connections can take on a variety of forms. For example in some equipment, such as a standard FAX machine, the terminal equipment and the modem reside in the same housing. Also telephone network 30 may use any of a variety of methods well known in the art to convey analog signal 120 to its destination. Such methods may include digitizing the signal and transmitting the signal via a satellite to a remote location where audible signal 130 is created.

Figure 2:
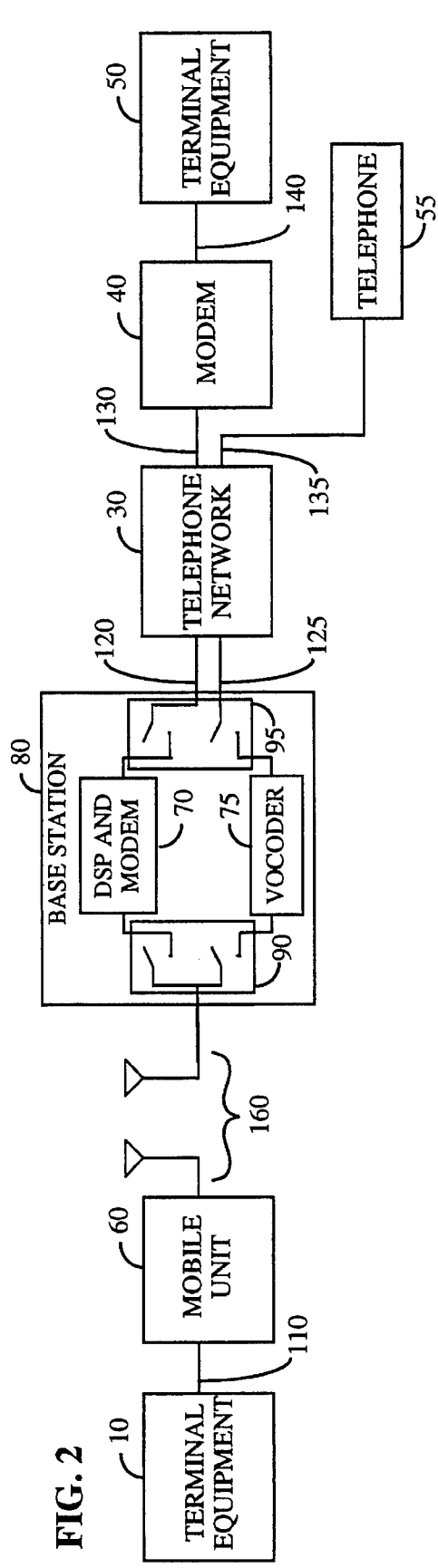
FIG. 2 is an apparatus that uses standard telephone networks and a digital wireless link to convey data from one terminal to another and to convey voice from one telephone to another.

A wireless link is introduced into the configuration of FIG. 1 when a user would like to connect his terminal equipment but does not have access to a land telephone network. The user may instead have a digital mobile communications device. FIG. 2 is an exemplary embodiment of such a configuration. In FIG. 2, modem 20 has been replaced with mobile unit 60, wireless link 160, and digital signal processor (DSP) and modem 70. DSP and modem 70 resides in base station 80 which is also capable of handling digital voice communications. FIG. 2 assumes that just one wireless link has been introduced. The description that follows applies equally if communication is achieved with two wireless links.

Referring to FIG. 2, assume again that terminal equipment 10 is transmitting information to terminal equipment 50. Terminal equipment 10 produces digital data 110 representative of the information. Mobile unit 60 modulates digital data 110 and provides output over wireless link 160. The signal from wireless link 160 is received by base station 80 and DSP and modem 70 through switch 90. DSP and modem 70 converts the digital signal to analog signal 120 which is the same signal output by modem 20 in FIG. 1. DSP and modem 70 outputs analog signal 120 through switch 95. Telephone network 30 conveys analog signal 120 to its destination. The telephone network may introduce noise such that output audible signal 130 is an estimate of analog signal 120. Modem 40 converts audible signal 130 to digital data 140 which is an estimate of digital data 110. Terminal equipment 50 receives digital data 140 and can act on the estimate of the information sent by terminal equipment 10. This link is bi-directional with the reverse functions working in the same manner as the forward.

In FIG. 2, base station 80 is also capable of handling voice communications. If mobile unit 60 and base station 80 are involved in voice communication, the voice signal from mobile unit 60 is transmitted over wireless link 160 and received by base station 80. The voice signal is received by vocoder 75 through switch 90. Audible signal 125 is routed to Telephone network 30 though switch 95. Telephone network 30 produces audible signal 135 for telephone 55. This link is bi-directional with the reverse functions working in the same manner as the forward.

One of the great advantages of the digital link is the great flexibility available at the mobile unit. With a standard FM analog link, a separate connection is needed for each type of service. For example, a user cannot place a telephone call while sending a FAX. However, due to the use of a vocoder which comprises an efficient compression mechanism, a digital link can send standard voice at a rate less than full rate. Thus a mobile unit may send data communication in the time slots where no voice is sent. This mechanism allows a mobile unit to provide simultaneous bi-directional voice and data capabilities.

Figure 3:
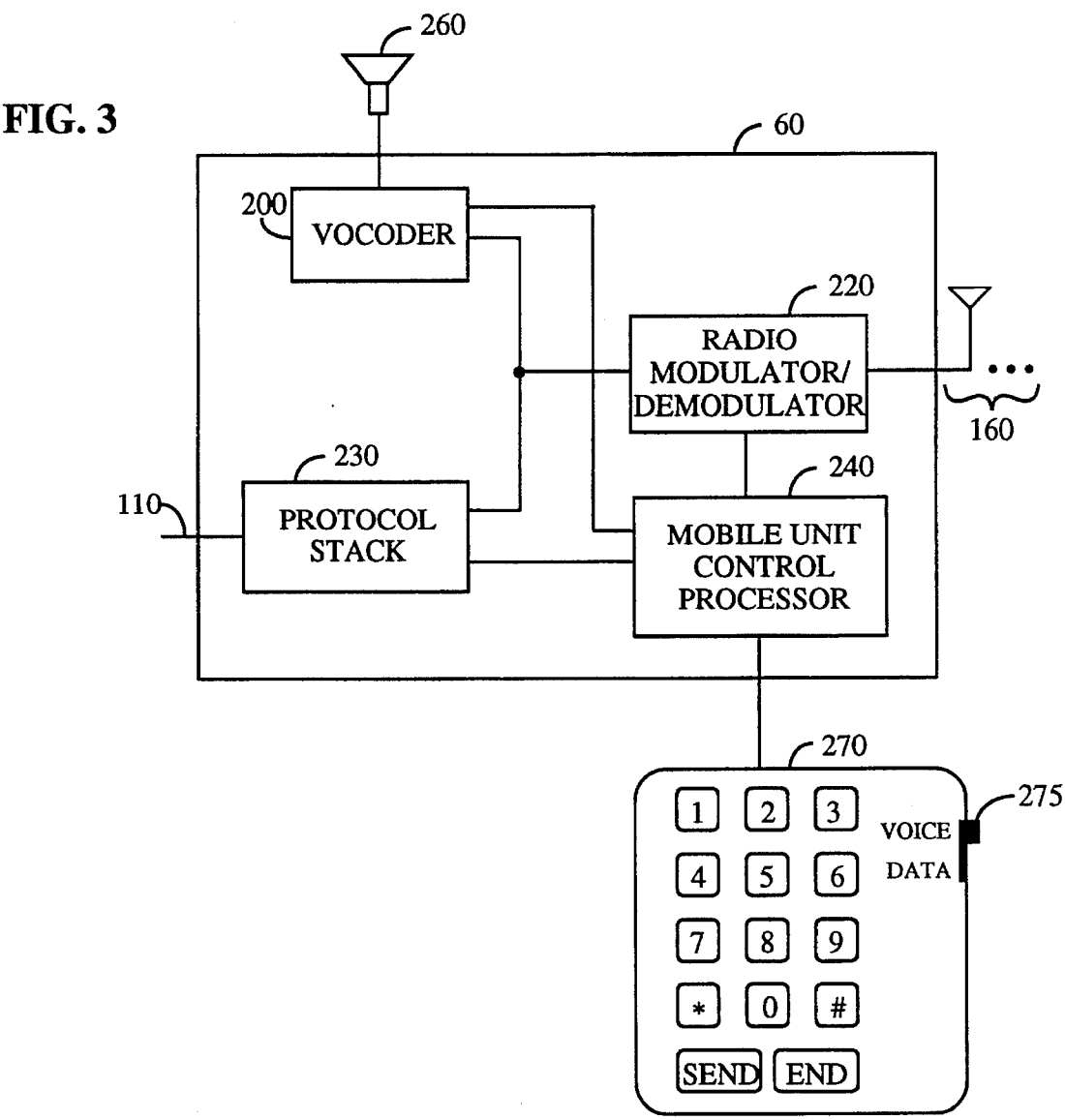
FIG. 3 is a detailed representation of an exemplary configuration of a mobile unit used to connect terminal equipment to a telephone network.

FIG. 3 provides a more detailed representation of an exemplary configuration of mobile unit 60. In FIG. 3, mobile unit 60 provides both voice and data capabilities. In FIG. 3, digital data 110 is connected to protocol stack 230 within mobile unit 60. Protocol stack 230 is capable of bi-directional communication with terminal equipment 10, mobile unit control processor 240 and radio modulator/demodulator 220. When protocol stack 230 receives digital data 110 for transmission over wireless link 160, it provides any required encoding and passes the encoded information to radio modulator/demodulator 220 under the control of mobile unit control processor 240. Radio modulator/demodulator 220 modulates the encoded information and provides the signal for transmission to wireless link 160. Inversely when a signal containing information for terminal equipment 10 arrives, radio modulator/demodulator 220 demodulates the signal and provides it to protocol stack 230.

Likewise when vocoder 200 receives audible input from speaker/microphone 260 for transmission over wireless link 160, it encodes the information and passes the encoded information to radio modulator/demodulator 220 under the control of mobile unit control processor 240. Radio modulator/demodulator 220 modulates the encoded information and provides the signal for transmission to wireless link 160. When a signal containing information for output on speaker/microphone 260 arrives on wireless link 160, modulator/demodulator 220 demodulates the signal and provides it to vocoder 200. Vocoder 200 decodes the signal and provides audible output to speaker/microphone 260.

Mobile unit control processor 240 provides control over the functions of mobile unit 60. Mobile unit control processor 240 also is capable of bi-directional communication with keypad 270, protocol stack 230, vocoder 200, and radio modulator/demodulator 220. Keypad provides a user interface to mobile unit control processor 240. In addition, information intended for mobile unit control processor 240 might come over wireless link 160 or from digital data 110.

Protocol stack 230 provides the main control center for data communication with terminal equipment 10 over wireless link 160. Protocol stack 230 may need to provide flow control. For example, digital data 110 may have a data rate that is higher than that of which wireless link 160 is capable. In this case protocol stack 230 may store the excess data and recall data at a rate appropriate for output on the link. Also protocol stack 230 must packetize digital data 110 provided by terminal equipment 10 into frames for radio modulator/demodulator 220 and unpacketize frames from radio modulator/demodulator 220 for digital data 110.

Protocol stack 230 must also recognize an array of special commands. Referring again to FIGS. 1 and 2, terminal equipment 10 can produce several categories of output. Terminal equipment 10 can produce information for transfer to terminal equipment 50. Terminal equipment 10 can produce commands for modem 20 which are not to be transferred to terminal equipment 50. Because in FIG. 2, modem 20 of FIG. 1 has been replaced with mobile unit 60, wireless link 160, and DSP and modem 70, if terminal equipment 10 sends a message intended for the local modem the message must be sent over wireless link 160.

In FIG. 2, when a link is established between terminal equipment 10 and terminal equipment 50, the system is said to be in data active mode. When such a link does not exist, the system is said to be in data idle mode. In data mode and data active, mobile unit 60 and DSP and modem 70, provide analog signal 120 in response to digital data 110.

In FIG. 2, when terminal equipment 10 sends a message intended solely for mobile unit 60 and DSP and modem 70, the system is said to be in command mode. In this mode, terminal equipment 10 may send command instructions or set parameters directly with mobile unit 60 and DSP and modem 70. The commands sent are not transferred into analog signal 120. In response to messages in command mode, mobile unit 60 and DSP and modem 70 may provide result codes indicating the successful or defective execution of a command. Command mode can be invoked independent of an established data connection. Therefore three possible data states exist: command mode and data idle, command mode and data active, data mode and data active.

Figure 4:
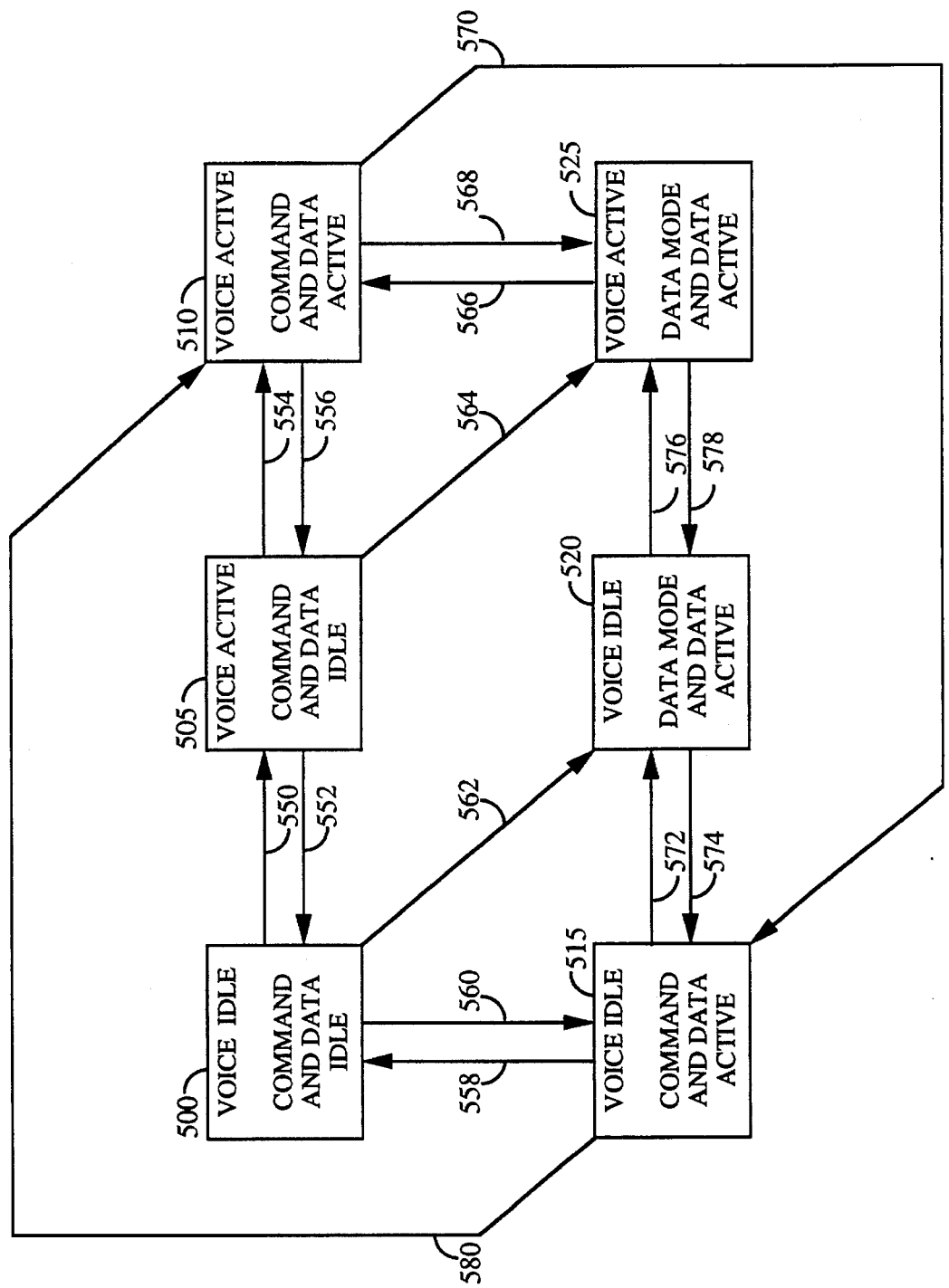
FIGS. 4 illustrates the six possible mobile unit states and the possible transfers from one state to another.

Combining, the two different voice modes and the three possible data modes, mobile unit 60 can be in one of six different states as shown in FIG. 4. New commands not presently used in standard modem configurations are required to transfer from one state to another. For example, if both an active data connection and an active voice connection are established, a user may wish to terminate the voice connection and retain the data connection. The command sent to the base station must designate which connection is to be canceled.

Similar new commands are needed to establish connections. Using a standard telephone system, the connection for voice service and data service is the same. As illustrated in FIGS. 2 and 3, with the introduction of the digital wireless link, the voice connection and the data connection are different. For example in FIG. 2, base station 80 must know whether to route an incoming call to DSP and modem 70 or to vocoder 75.

At first glance, one might think to designate all connections invoked from keypad 270 as voice connections and all connections invoked through digital data 110 as data connections. However situations exist where terminal equipment 10 initiates a voice connection. One such situation is when a repertory dialer sets up a voice connection. A repertory dialer installed on a personal computer is typically a software package that allows a user store telephone numbers. The stored numbers can be automatically dialed for the user and output from the personal computer as digital data 110. The connection desired by the user in such a case is a voice connection. Therefore a new command to initiate a voice connection from the terminal equipment is created. For example, the new command may be designated as "AT+CDV" meaning establish a voice connection.

Also, a user may wish to establish a data connection through use of the keypad. An example of such a use is when the terminal equipment is incapable of dialing the quantity of numbers necessary to place a call such as when a user is attempting to establish an overseas data connection using a call card access code. Referring again to FIG. 3, switch 275 designates the connection as either voice or data. Many other implementations may be used to designate the type of connection such as a menu selection, a special key, a voice command, or a prefix or suffix attached to the dialed number. An active data connection established by the keypad may be either in command mode or data mode. The ability to cancel a data connection may also be issued from the keypad.

Note that ability to establish a voice connection from a terminal unit and the ability to establish a data connection from the keypad is desirable in those case where simultaneous voice and data connections are not possible. For example, if a user has a mobile unit which does not support simultaneous voice and data connections, he may still wish to use his repertory dialer to establish a voice connection.

FIG. 4 represents the six states and defines transitions between the states. Block 500 represents voice idle, command mode and data idle. Thus block 500 represents the case where no voice connection nor terminal equipment to terminal equipment connection is established. In this state, terminal equipment 10 may send commands to mobile unit 60 and DSP and modem 70.

From block 500, mobile unit 60 may establish a voice connection moving into block 505 as represented by arrow 550. Block 505 represents voice active, command mode and data idle. Arrow 550 may represent at least two possible commands. The first command is a numeric entry on keypad 270 followed by "SEND". Typically this sequence is entered by the user from keypad 270. The second type of command may be issued by terminal equipment 10 or keypad 270. For example, the new command may be designated as "AT+CDV" meaning establish a voice connection.

From block 505, mobile unit 60 may terminate the voice connection moving into block 500 as represented by arrow 552. Arrow 552 may represent at least two possible commands. The first command is "END" which is typically entered by the user from keypad 270. A second command is a command issued from terminal equipment 10 or from keypad 270 to hang up the voice connection. For example, the command may be designated as "AT+CHV" meaning terminate the voice connection. This is also a new command. The command would not terminate an active data connection.

From block 505, mobile unit 60 may establish a data connection for data transfer while retaining the voice connection thus moving into block 525 as represented by arrow 564. Arrow 564 represents a command to DSP and modem 70 to establish a data connection. A standard command designation for such a function is "ATDT#" meaning establish the data connection ready for data transfer to the number indicated. Such a command may be issued from terminal equipment 10 or keypad 270.

From block 505, mobile unit 60 may establish a data connection while retaining the voice connection and remaining in command mode thus moving into block 510 as represented by arrow 554. Arrow 554 represents a command to DSP and modem 70 to establish a data connection but after establishing the connection to remain ready to receive commands from terminal equipment 10. A standard command designation for such a function is "ATDT#;". Such a command may be issued from terminal equipment 10 or keypad 270.

From block 510, mobile unit 60 may terminate the active voice connection while remaining in command mode and retaining the active data connection thus moving into block 515 as represented by arrow 570. Arrow 570 may represent same command as arrow 552. As such, arrow 570 may indicate the receipt of "END" or "AT+CHV".

From block 510, mobile unit 60 may terminate the active data connection while retaining the active voice connection thus moving into block 505 as represented by arrow 556. Arrow 556 represents a command to DSP and modem 70 to terminate the data connection while maintaining the voice connection through vocoder 75. A standard command designation for such a function is "ATH" meaning hang up the data connection. Such a command may be issued from terminal equipment 10 or keypad 270.

From block 510, mobile unit 60 may enter data mode on the active data connection while retaining the active voice connection thus moving into block 525 as represented by arrow 568. Arrow 568 may represent at least two alternative commands. The first command, standardly referred to as "ATO", is issued by terminal equipment 10 and indicates that DSP and modem 70 should enter data mode to pass data to terminal equipment 50. Another alternative is send "ATDT#". The alternative means of connection would be used for systems which require two stage dialing. For example, a main telephone number was originally sent and that connection established. Now to connect to terminal equipment 50, a telephone extension must be entered. Each of these commands may be issued from terminal equipment 10 or keypad 270.

From block 525, mobile unit 60 may enter command mode while maintaining the active data connection and retaining the active voice connection thus moving into block 510 as represented by arrow 566. Arrow 566 may represent a standard "Escape" sequence.

Also from block 525, mobile unit 60 may maintain the active data connection while terminating the active voice connection thus moving into block 520 as represented by arrow 578. Arrow 578 may represent an "END" which is typically entered by the user from keypad 270. Note that a command sent from terminal equipment 10 would not terminate the voice connection because the system is presently in a data transfer mode. If terminal equipment sent a command in this state the command would be directly transferred to terminal equipment 50 and thus not cause the desired disconnection.

From block 520, mobile unit 60 may establish an active voice connection while maintaining the active data connection thus moving into block 525 as represented by arrow 576. Arrow 576 may represent a numeric entry on keypad 270 followed by "SEND". Typically this sequence is entered by the user from keypad 270. Again, a command sent from terminal equipment 10 would not establish a voice connection due to the state of the system being data transfer mode.

From block 520, mobile unit 60 may enter command mode while maintaining the active data connection thus moving into block 515 as represented by arrow 574. Arrow 574 may represent a standard "Escape" sequence.

From block 515, mobile unit 60 may enter data mode on the active data connection thus moving into block 520 as represented by arrow 572. Arrow 572 may represent the same commands as arrow 568: "ATO" or "ATDT#" as required by two stage dialing systems.

From block 515, mobile unit 60 may enter voice active mode thus moving into block 510 as represented by arrow 580. Arrow 580 may represent the same commands as arrow 550: a numeric entry on keypad 270 on mobile unit 60 followed by "SEND" or "AT+CDV#" from terminal equipment 10 or keypad 270.

From block 515, mobile unit 60 may terminate the active data connection thus moving into block 500 as represented by arrow 558. Arrow 558 represents a command to DSP and modem 70 to terminate the data connection designated as "ATH". Such a command may be issued from terminal equipment 10 or keypad 270.

From block 500, mobile unit 60 may establish a data connection in command mode thus moving into block 515 as represented by arrow 560. Arrow 560 represents the standard command designated "ATDT#;". Such a command may be issued from terminal equipment 10 or keypad 270.

From block 500, mobile unit 60 may establish a data connection for data transfer thus moving into block 520 as represented by arrow 562. Arrow 562 the standard command designated "ATDT#". Such a command may be issued from terminal equipment 10 or keypad 270.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit when said communication system is in said initial state a first message on said terminal equipment signal wherein in said initial state said communication system is in a command mode such that said mobile unit interprets and acts upon said first message;

entering by said communication system a second state in response to said first message and establishing said voice connection over said wireless link wherein in said second state said communication system is in said command mode, said data connection is in said idle state, and said voice connection is in an active state;

receiving at said mobile station when said communication system is in said second state a second message on said manual user signal;

entering by said communication system a third state in response to said second message and establishing said data connection wherein in said third state said communication system is in said command mode, said data connection is in an active state, and said voice connection is in said active state;

receiving at said mobile station when said communication system is in said third state a third message on said terminal equipment signal;

entering by said communication system a fourth state in response to said third message and changing said communication system mode to a data mode wherein in said fourth state said communication system is in said data mode, said data connection and said voice connection are in said active state and wherein when said communication system is in said data mode said mobile unit passes said terminal equipment signal over said data connection as said data signals;

receiving at said mobile station when said communication system is in said fourth state a fourth message on said manual user signal;

entering by said communication system a fifth state in response to said fourth message and disconnecting said voice connection wherein in said fifth state said communication system is in said data mode, said data connection is in said active state and said voice connection is in said idle state;

receiving at said mobile station when said communication system is in said fifth state an escape sequence on said terminal equipment signal;

entering by said communication system a sixth state in response to said escape sequence and changing said communication system mode to said command mode wherein in said sixth state said communication system is in said command mode, said data connection is in said active state and said voice connection is in said idle state;

receiving at said mobile station when said communication system is in said sixth state a fifth message on said manual user signal; and entering by said communication system said initial state in response to said fifth message and disconnecting said data connection.

2. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit when said communication system is in said initial state a first message on said terminal equipment signal wherein in said initial state said communication system is in a command mode such that said mobile unit interprets and acts upon said first message;

entering by said communication system a second state in response to said first message and establishing said voice connection over said wireless link wherein in said second state said communication system is in said command mode, said data connection is in said idle state, and said voice connection is in an active state;

receiving at said mobile station when said communication system is in said second state a second message on said manual user signal;

entering by said communication system a fourth state in response to said second message, establishing said data connection, and changing said communication system mode to a data mode wherein in said fourth state said communication system is in said data mode, said data connection is in an active state, and said voice connection is in said active state and wherein when said communication system is in said data mode said mobile unit passes said terminal equipment signal over said data connection as said data signals;

receiving at said mobile station when said communication system is in said fourth state a third message on said manual user signal;

entering by said communication system a fifth state in response to said third message and disconnecting said voice connection wherein in said fifth state said communication system is in said data mode, said data connection is in said active state and said voice connection is in said idle state;

receiving at said mobile station when said communication system is in said fifth state an escape sequence on said terminal equipment signal;

entering by said communication system a sixth state in response to said escape sequence and changing said communication system mode to said command mode wherein in said sixth state said communication system is in said command mode, said data connection is in said active state and said voice connection is in said idle state;

receiving at said mobile station when said communication system is in said sixth state a fifth message on said manual user signal; and entering by said communication system said initial state in response to said fifth message and disconnecting said data connection.

3. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit a first message on said terminal equipment signal wherein in said initial state said communication system is in a command mode such that said mobile unit interprets and acts upon said first message;

entering by said communication system a second state in response to said first message and establishing said voice connection over said wireless link wherein in said second state said communication system is in said command mode, said data connection is in said idle state, and said voice connection is in an active state;

receiving at said mobile station when said communication system is in said second state a second message on said terminal equipment signal;

entering by said communication system a fourth state in response to said second message, establishing said data connection, and changing said communication system mode to a data mode wherein in said fourth state said communication system is in said data mode, said data connection is in an active state and said voice connection is in said active state and wherein when said communication system is in said data mode said mobile unit passes said terminal equipment signal over said data connection as said data signals;

receiving at said mobile station when said communication system is in said fourth state a third message on said manual user signal;

entering by said communication system a fifth state in response to said third message and disconnecting said voice connection wherein in said fifth state said communication system is in data mode, said data connection is in said active state and said voice connection is in said idle state;

receiving at said mobile station when said communication system is in said fifth state an escape sequence on said terminal equipment signal;

entering by said communication system a sixth state in response to said escape sequence and changing said communication system mode to said command mode wherein in said sixth state said communication system is in said command mode, said data connection is in said active state and said voice connection is in said idle state;

receiving at said mobile station when said communication system is in said sixth state a fourth message on said manual user signal; and entering by said communication system said initial state in response to said fourth message and disconnecting said data connection.

4. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit a first message on said manual user signal wherein in said initial state said communication system is in a command mode such that said mobile unit interprets and acts upon said first message;

entering by said communication system a fifth state in response to said first message and establishing said data connection wherein in said fifth state said communication system is in a data mode, said data connection is in an active state and said voice connection is in said idle state and wherein when said communication system is in said data mode said mobile unit passes said terminal equipment signal over said data connection as said digital signals;

receiving at said mobile station when said communication system is in said second state a second message on said terminal equipment signal;

entering by said communication system a fourth state in response to said second message, and establishing said voice connection, wherein in said fourth state said communication system is in said data mode, said data connection is in said active state and said voice connection is in an active state;

receiving at said mobile station when said communication system is in said fourth state an escape sequence on said terminal equipment signal;

entering by said communication system a third state in response to said escape sequence and changing said communication system mode to said command mode wherein in said third state said communication system is in said command mode, said data connection is in said active state, and said voice connection is in said active state;

receiving at said mobile station when said communication system is in said third state a third message on said terminal equipment signal;

entering by said communication system a sixth state in response to said third message and disconnecting said voice connection wherein in said sixth state said communication system is in said command mode, said data connection is in said active state and said voice connection is in said idle state;

receiving at said mobile station when said communication system is in said sixth state a fourth message on said manual user signal; and entering by said communication system in response to said fourth said initial state and disconnecting said data connection.

5. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit when said communication system is in said initial state a first message on said terminal equipment signal wherein in said initial state said communication system is in a command mode such that said mobile unit interprets and acts upon said first message;

entering by said communication system a sixth state in response to said first message and establishing said data connection wherein in said sixth state said communication system is in said command mode, said data connection is in an active state and said voice connection is in said idle state;

receiving at said mobile station when said communication system is in said second state a second message on said terminal equipment signal;

entering by said communication system a third state in response to said second message and establishing said voice connection wherein in said third state said communication system is in said command mode, said data connection is in said active state, and said voice connection is in an active state;

receiving at said mobile station when said communication system is in said third state a third message on said terminal equipment signal;

entering by said communication system a fourth state in response to said third message and changing said communication system mode to a data mode wherein in said fourth state said communication system is in said data mode, said data connection and said voice connection are in said active state and wherein when said communication system is in said data mode said mobile unit passes said terminal equipment signal over said data connection as said data signals;

receiving at said mobile station when said communication system is in said fourth state an escape sequence on said terminal equipment signal;

entering by said communication system said third state in response to said escape sequence and changing said communication system mode to said command mode;

receiving at said mobile unit when said communication system is in said third state a fourth message on said manual user signal;

entering by said communication system a second state in response to said fourth message and disconnecting said data connection over said wireless link wherein in said second state said communication system is in said command mode, said data connection is in said idle state, and said voice connection is in said active state;

receiving at said mobile station when said communication system is in said second state a fourth message on said terminal equipment signal; and entering by said communication system in response to said fourth said initial state and disconnecting said voice connection.

6. A method of invoking and canceling data or voice service in a communication system comprised of a mobile unit having a data port for receiving and providing a terminal element signal, a voice port and vocoder for receiving and providing encoded voice signals, a wireless port for receiving and providing data signals and said encoded voice signals over a wireless link, and a keypad port for receiving and providing a manual user signal, said system further comprising a base station having a vocoder for receiving and providing said encoded voice signals, a modem for receiving and providing said data signals, and a wireless link port for receiving and providing said data signals and said encoded voice signals over said wireless link, wherein said communication system supports the simultaneous transfer of said encoded voice signals between said voice port and vocoder of said mobile unit and said vocoder of said base station on a voice connection and said data signals between said data port of said mobile unit and said modem of said base station on a data connection, wherein initially said communication system is in an initial state wherein said voice connection and said data connection are in an idle state, comprising the steps of:

receiving at said mobile unit when said communication system is in said initial state a first message on said terminal equipment signal wherein in said initial state said communication system is in a command mode such that said mobile unit interprets and acts upon said first message;

entering by said communication system a second state in response to said first message and establishing said voice connection over said wireless link wherein in said second state said communication system is in said command mode, said data connection is in said idle state, and said voice connection is in an active state;

receiving at said mobile station when said communication system is in said second state a second message on said terminal equipment signal;

entering by said communication system a third state in response to said second message and establishing said data connection wherein in said third state said communication system is in said command mode, said data connection is in an active state, and said voice connection is in said active state;

receiving at said mobile station when said communication system is in said third state a third message on said terminal equipment signal;

entering by said communication system a fourth state in response to said third message and changing said communication system mode to a data mode wherein in said fourth state said communication system is in said data mode, said data connection and said voice connection are in said active state and wherein when said communication system is in said data mode said mobile unit passes said terminal equipment signal over said data connection as said data signals;

receiving at said mobile station when said communication system is in said fourth state a fourth message on said manual user signal;

entering by said communication system a fifth state in response to said fourth message and disconnecting said voice connection wherein in said fifth state said communication system is in said data mode, said data connection is in said active state and said voice connection is in said idle state;

receiving at said mobile station when said communication system is in said fifth state an escape sequence on said terminal equipment signal;

entering by said communication system a sixth state in response to said escape sequence and changing said communication system mode to said command mode wherein in said sixth state said communication system is in said command mode, said data connection is in said active state and said voice connection is in said idle state;

receiving at said mobile station when said communication system is in said sixth state a fifth message on said terminal equipment signal; and entering by said communication system said initial state in response to said fifth message and disconnecting said data connection.

\* \* \* \* \*